US009882785B2

(12) United States Patent
Liu et al.

(10) Patent No.: US 9,882,785 B2
(45) Date of Patent: Jan. 30, 2018

(54) SOCIAL NETWORK CONTENT SPREAD VISUALIZATION

(71) Applicant: Microsoft Technology Licensing, LLC, Redmond, WA (US)

(72) Inventors: Ying Liu, Palo Alto, CA (US); Haipeng Li, Mountain View, CA (US); Paul Hyunwoo Ko, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 264 days.

(21) Appl. No.: 14/622,347

(22) Filed: Feb. 13, 2015

(65) Prior Publication Data

US 2016/0241447 A1    Aug. 18, 2016

(51) Int. Cl.
| | |
|---|---|
| *G06F 3/048* | (2013.01) |
| *H04L 12/24* | (2006.01) |
| *H04L 29/08* | (2006.01) |
| *G06F 3/0484* | (2013.01) |
| *G06Q 50/00* | (2012.01) |

(52) U.S. Cl.
CPC ............ *H04L 41/22* (2013.01); *G06F 3/0484* (2013.01); *G06Q 50/01* (2013.01); *H04L 67/22* (2013.01); *H04L 67/306* (2013.01)

(58) Field of Classification Search
CPC ................................ H04L 51/32; H04L 67/22
See application file for complete search history.

(56) References Cited

U.S. PATENT DOCUMENTS

| | | | | |
|---|---|---|---|---|
| 6,662,219 | B1 * | 12/2003 | Nishanov | H04L 67/10 709/209 |
| 2008/0256233 | A1 * | 10/2008 | Hall | G06Q 30/02 709/224 |
| 2013/0298038 | A1 * | 11/2013 | Spivack | H04L 65/403 715/753 |
| 2014/0149888 | A1 * | 5/2014 | Morris | G06F 15/16 715/753 |
| 2014/0244624 | A1 * | 8/2014 | Isaacson | G06F 17/30958 707/722 |
| 2015/0120721 | A1 * | 4/2015 | Kim | G06F 17/3053 707/728 |

* cited by examiner

*Primary Examiner* — Claudia Dragoescu
(74) *Attorney, Agent, or Firm* — Schwegman Lundberg & Woessner, P.A.

(57) ABSTRACT

A system and method for content spread visualization includes obtaining activity data related to a content item of the social network, the activity data related to interactions by members of the social network with the content item. A processor generates the visualization based on the activity data, the visualization including indicia arranged in hierarchical branches, the branches extending radially from a primary indicia of the indicia, each of the indicia individually corresponding to one of the activity data and connected to at least one other one of the indicia with a couple based on a relationship between the corresponding ones of the activity data. The processor causes a user interface to display the visualization.

20 Claims, 6 Drawing Sheets

SOCIAL NETWORK CONTENT SPREAD VISUALIZATION

TECHNICAL FIELD

The subject matter disclosed herein generally relates to providing a visualization of the spread of content through a social network.

BACKGROUND

Social networks conventionally allow for various users of the social network, including members, sponsoring entities, groups, organizations, and the like, to post content items to the social network. The content items, such as web links, notifications, personal or organizational statements, and the like, may be displayed on the user interfaces of members and other users of the social network according to various criteria. The members of the social network may interact with the content items by, for instance, clicking on a links, "liking" the content item, commenting on the content item, or sharing the content item with other members of the social network.

BRIEF DESCRIPTION OF THE DRAWINGS

Some embodiments are illustrated by way of example and not limitation in the figures of the accompanying drawings.

DETAILED DESCRIPTION

Figure 1:
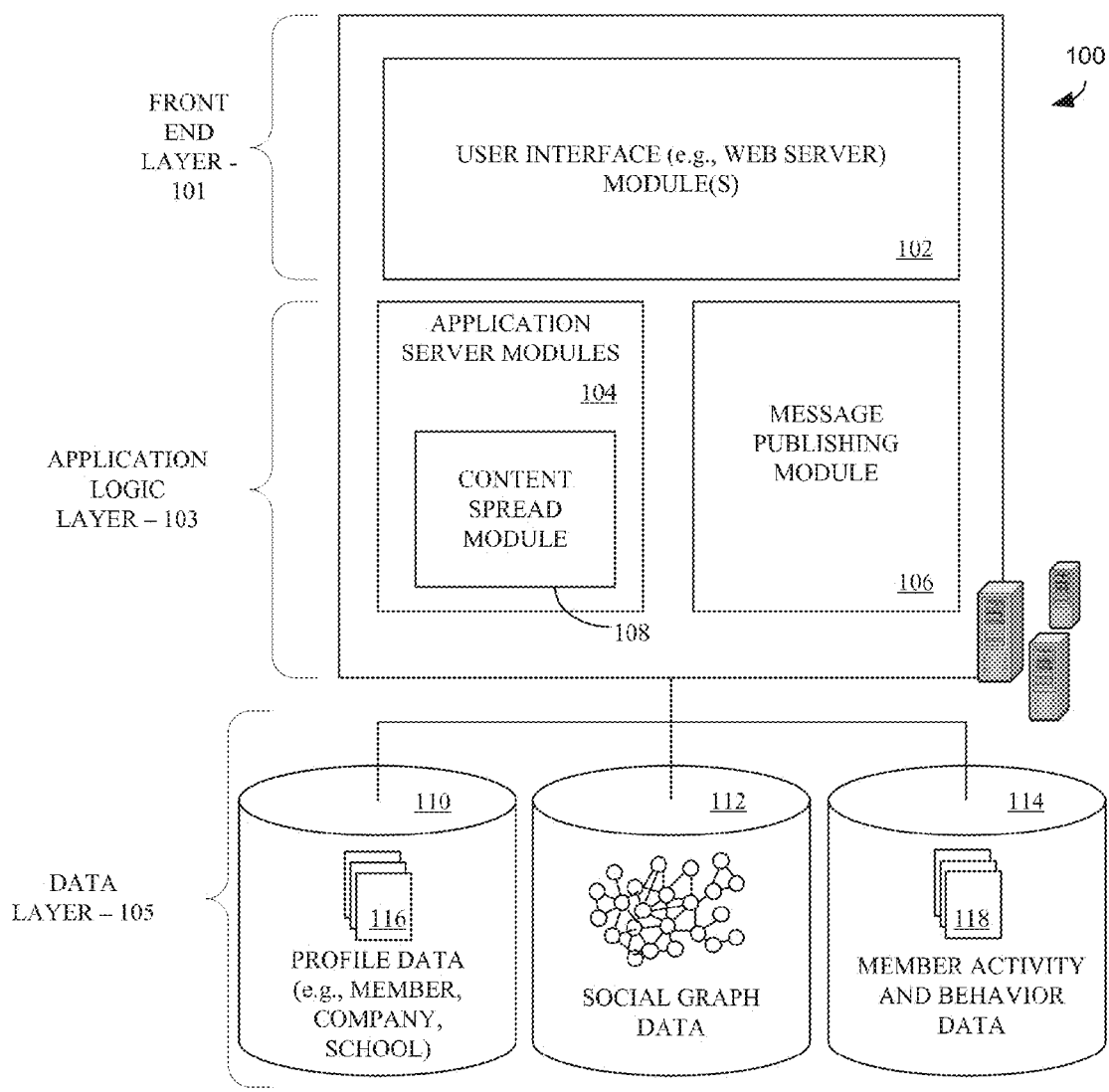
FIG. 1 is a block diagram illustrating various components or functional modules of a social network system, consistent with some examples.

Example methods and systems are directed to visualizing the spread of content through a social network. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

A content item that is posted to the social network by a user may only seen or may only be seeable by the members who are connected on the social network with the user that posted the content item. However, members who are connected with the user who posted the content item may share the content item with their connections in the social network. Sharing may thus cause the content item to spread through the social network; the more members who share the content item, the wider the content item is likely to spread and be seen by members and users of the social network.

Understanding how content items spread through the social network may not, however, be intuitive. Simply observing the number of times a content item has been shared or viewed by members of the social network may not show which members tend to cause the content item to spread. Simply showing a diagram of what members have seen or shared a content item similarly may not distill out relevant information as to how content spreads. For instance, a content item may be shared such that the same content item appears on a member's user interface multiple times, but only one of those times may result in the member interacting with the content item.

In particular, understanding which members or users of the social network cause content items to spread through a social network may allow for efficiencies in the provision of the social network. The sharing of content items through the social network may tend to increase social network traffic. But the dedication of resources to aspects of the social network that do not tend to cause content items to spread through the social network may lessen the experience on the social network for various members. By providing a visualization of how content items spread through the social network, policies may be put in place that may enhance the social network for the members and allow for the direction of physical resources to the most efficient members and "places" in the social network.

A content spread visualization mechanism has been developed that illustrates how content items progress through a social network. By showing how a content item radiates out from certain members, the visualization illustrates nodes or centers in the social network that account for how a content item may become prevalent in the social network. The visualization includes members who have interacted with a content item rendered as an indicia, such as a point, and connected by a line to members who subsequently interacted with the content item owing to the first member's interaction. Thus, members who have caused relatively large numbers of other members to interact with the content item may show up clearly and centralized in the visualization.

FIG. 1 is a block diagram illustrating various components or functional modules of a social network system 100, consistent with some examples. The social network system 100 may be utilized to provide content item spread visualization within the user interface of the social network system 100. While the visualization is described with particular respect to the social network system 100, it is to be recognized and understood that the principles described with respect to content spread visualization may be applied to any of a variety of platforms and electronic messages beyond those directly applicable to a social network generally.

A front end 101 consists of a user interface module (e.g., a web server) 102, which receives requests from various client-computing devices, and communicates appropriate responses to the requesting client devices. For example, the user interface module(s) 102 may receive requests in the form of Hypertext Transport Protocol (HTTP) requests, or other web-based, application programming interface (API) requests. An application logic layer 103 includes various application server modules 104, which, in conjunction with the user interface module(s) 102, may generate various user interfaces (e.g., web pages, applications, etc.) with data retrieved from various data sources in a data layer 105. In some examples, individual application server modules 104 may be used to implement the functionality associated with various services and features of the social network service. For instance, the ability of an organization to establish a presence in the social graph of the social network system 100, including the ability to establish a customized web page on behalf of an organization, and to publish messages or status updates on behalf of an organization, may be services implemented in independent application server modules 104. Similarly, a variety of other applications or services that are made available to members of the social network service may be embodied in their own application server modules 104. Alternatively, various applications may be embodied in a single application server module 104. In some examples, the social network system 100 includes a content item publishing module 106, such as may be utilized to receive content, such as electronic messages, posts, links, images, videos, and the like, and publish the content to the social network.

One or more of the application server modules 104, the content item publishing module 106, or the social network system 100 generally may include a content spread module 108. As will be disclosed in detail herein, the content spread module 108 tracks or otherwise determines how a content item spreads through the social network and generates a visualization of that spread. The content spread module 108 may utilize activities in the social network in particular to track or otherwise determine how the content item has spread. The visualization may include indicia of members or other users of the social network that provided or interacted with the content item. The indicia are connected to one another in the visualization according to a sequence and causality by which the members interacted with the content item. The connections in the visualization generally radiate outward from the indicia of those members whose interactions contributed to large numbers of other members also interacting with the content item.

The content spread module 108 may be implemented on a separate server or may be part of a server that provides other portions of the social network system 100. Thus, it is to be understood that while the content spread module 108 is described as an integral component of a social network system 100, the principles described herein may be applied without the content spread module 108 being an integral part of a social network or even necessarily utilizing data from a social network if member profile information and user activities are available from alternative sources.

As illustrated, the data layer 105 includes, but is not necessarily limited to, several databases 110, 112, 114, such as a database 110 for storing profile data 116, including both member profile data as well as profile data for various organizations. Member profile data may include a list of connections each member has with other members of the social network. Consistent with some examples, when a person initially registers to become a member of the social network service, the person may be prompted to provide some personal information, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information is stored, for example, in the database 110. Similarly, when a representative of an organization initially registers the organization with the social network service, the representative may be prompted to provide certain information about the organization. This information may be stored, for example, in the database 110, or another database (not shown). With some examples, the profile data may be processed (e.g., in the background or offline) to generate various derived profile data. For example, if a member has provided information about various job titles the member has held with the same or different companies, and for how long, this information can be used to infer or derive a member profile attribute indicating the member's overall seniority level, or seniority level within a particular company. With some examples, importing or otherwise accessing data from one or more externally hosted data sources may enhance profile data for both members and organizations. For instance, with companies in particular, financial data may be imported from one or more external data sources, and made part of a company's profile.

Once registered, a member may invite other members, or be invited by other members, to connect via the social network service. A "connection" may require a bi-lateral agreement by the members, such that both members acknowledge the establishment of the connection. Similarly, with some examples, a member may elect to "follow" another member. In contrast to establishing a connection, the concept of "following" another member typically is a unilateral operation, and at least with some examples, does not require acknowledgement or approval by the member that is being followed. When one member follows another, the member who is following may receive status updates or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed or content stream. In any case, the various associations and relationships that the members establish with other members, or with other entities and objects, are stored and maintained within the social graph database 112.

Activities by users of the social network system 100 may be logged as activities 118 in the activity and behavior database 114. Such activities 118 may include interactions with content displayed on the social network. Interactions may include clicking on a link to read an article, commenting on a post to the social network, "liking" or otherwise approving of a post, sharing the post, or any of a variety of mechanisms by which a member may engage with social network content.

The social network service may provide a broad range of other applications and services that allow members the opportunity to share and receive information, often customized to the interests of the member. For example, with some examples, the social network service may include a photo sharing application that allows members to upload and share photos with other members. With some examples, members may be able to self-organize into groups, or interest groups, organized around a subject matter or topic of interest. With some examples, the social network service may host various job listings providing details of job openings with various organizations.

Although not shown, with some examples, the social network system 100 provides an application programming interface (API) module via which third-party applications can access various services and data provided by the social network service. For example, using an API, a third-party application may provide a user interface and logic that enables an authorized representative of an organization to publish messages from a third-party application to various content streams maintained by the social network service. Such third-party applications may be browser-based applications, or may be operating system-specific. In particular, some third-party applications may reside and execute on one or more mobile devices (e.g., phone, or tablet computing devices) having a mobile operating system.

Figure 2:
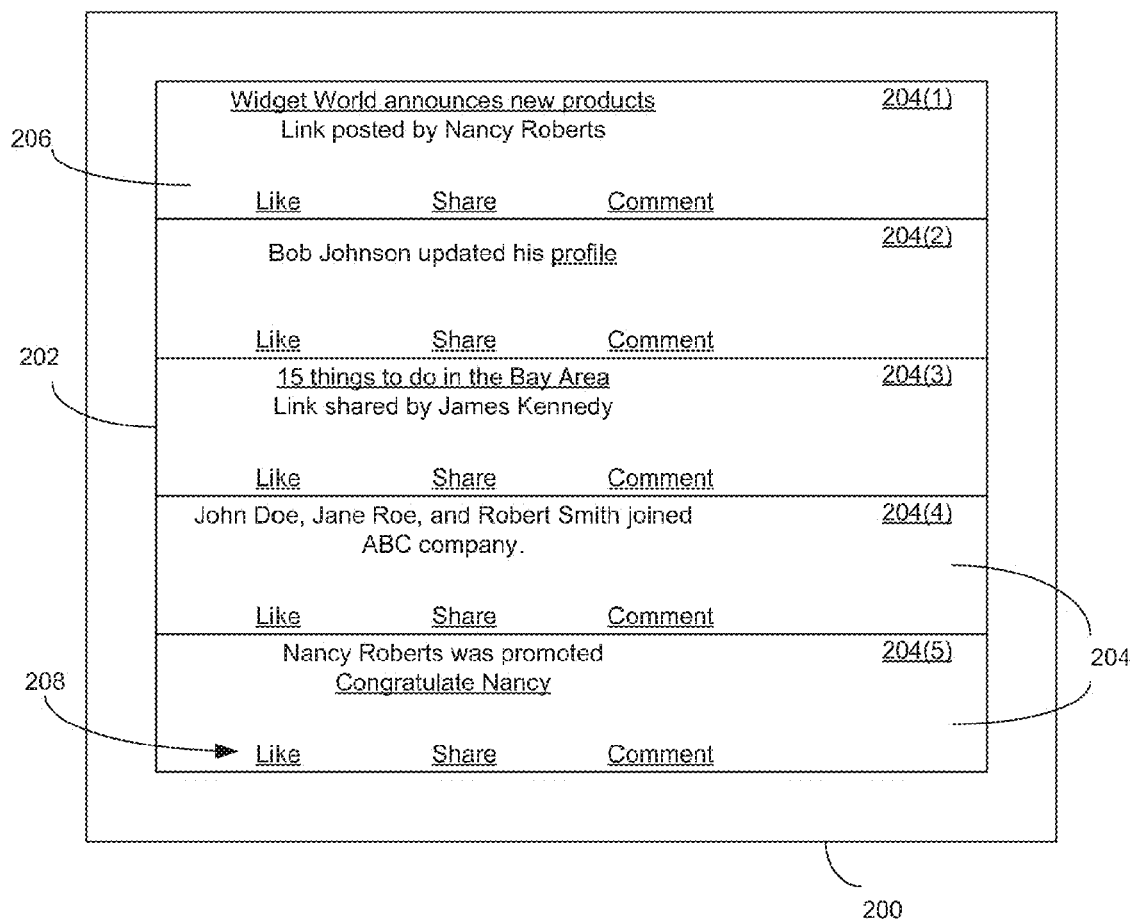
FIG. 2 is a depiction of a user interface as provided by the social network system, in an example embodiment.

FIG. 2 is a depiction of a user interface 200 as provided by the social network system 100, in an example embodiment. The user interface 200 includes a news feed 202 that includes multiple individual positions 204 arranged, in this example, in a vertical list with a first position 204(1) at the top and lower positions sequentially down the list. Each position 204 includes space to display content related to the content item 206; in various examples, the content item 206 itself may be displayed, for instance if the content item 206 is a link or a renderable image, or data relating to the content item 206 may be displayed, such as if the content item 206 needs to be reformatted for the user interface 200 or the circumstances in which the user interface 200 is being displayed. The positions further include links 208 to interact with the content item, including a link to "like" the content item 206, share the content item on the social network 200, and comment on the content item 206. Interactions may be stored in the activity database 114 as activities 118.

Interactions that provide, at least in part, for the spread of content items 206 through the social network are thus illustrated. The content items 206 illustrated have already spread through at least a portion of the social network in order to appear in the news feed 202. As illustrated, for certain content items 206, either a member or other entity introduced the content item 206 to the social network (e.g., "Link posted by Nancy Roberts") or the content item 206 was automatically generated by the social network (e.g., "John Doe, Jane Roe, and Robert Smith joined ABC company.") in which case the member associated with the user interface 200 is a direct connection to the subject member or entity of the content item 206, i.e., "Nancy Roberts" and "John Doe, Jane Roe, and Robert Smith", respectively. As further illustrated, a content item 206 is in the news feed 202 because of the interaction of another member with the content item 206 (e.g., "Link shared by James Kennedy"). In the illustrated example, a link that is "posted" is originally posted by the subject member, in the illustrated example "Nancy Roberts", while a link that is "shared" is originally posted by another member or entity who is not necessarily connected with the member associated with the user interface 200. Thus, the subject member of the content item 206, in the illustrated example "James Kennedy", caused the content item to spread because the subject member clicked the "share" link 208 and not because the subject member introduced the content item 206 to the social network in the first instance.

Figure 3:
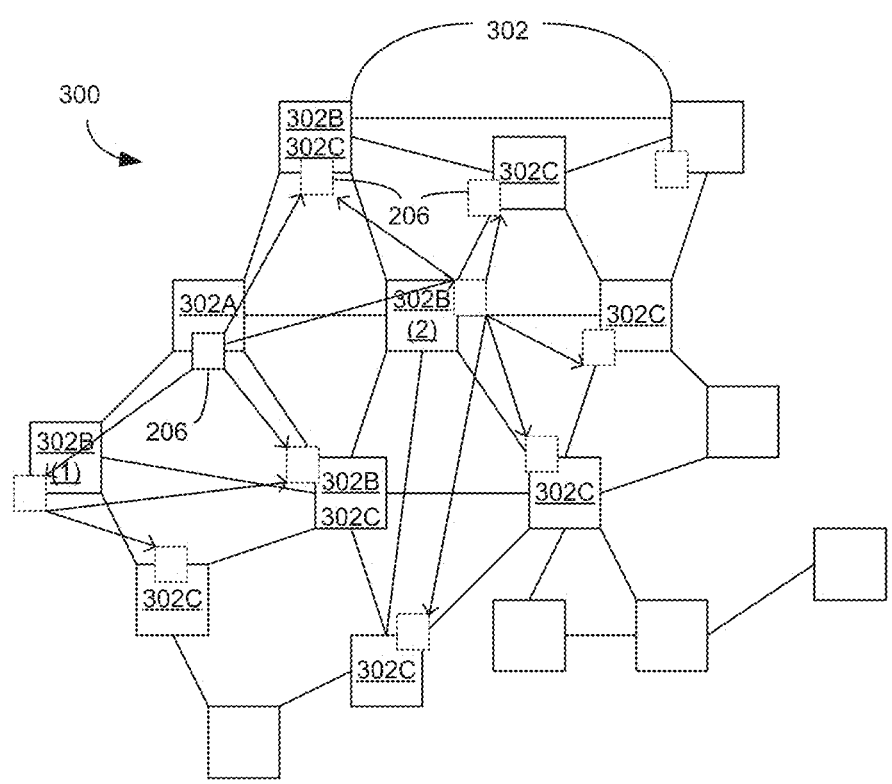
FIG. 3 is an abstract illustration of the spread of a content item through a social graph as stored in the social graph database, in an example embodiment.

FIG. 3 is an abstract illustration of the spread of a content item 206 through a social graph 300 as stored in the social graph database 112, in an example embodiment. The illustration using the social graph 300 stands in contrast to the content spread visualization disclosed herein (e.g., in FIG. 4). The social graph 300 is simplified for the purposes of illustration and it is to be understood that social graphs generally may have substantially greater scope and may incorporate additional information as appropriate.

The social graph 300 includes members 302 of the social network. Members 302 may specifically be users of the social network that include profile data 116 but, for the purposes of this illustration, may include any user or system that may originate a content item 206. Connections 304 between members 302 represent social network connections as disclosed herein and do not necessarily connote any physical communication link.

In the illustrated example, a content item 206 originates with a member 302A. As disclosed herein, the origination of the content item 206 may be from an affirmative action by the member 302A (e.g., posting a link, commenting on a post, etc.) or may be an automatically generated content item 206 (e.g., an automatic message alerting other members that the member 302A updated their profile information 116, etc.). Upon the content item 206 being originated, the social network system 100 causes the content item 206 to be displayed on a user interface 200 associated with other members 302B who have a direct connection 304 to the member 302A.

In the illustrated example, the content item 206 spreads further through the social graph 300 when two of the original recipients 302B(1), 302B(2) interact with the content item 206 (e.g., by sharing the content item 206, commenting on the content item 206, etc.). Upon the recipients 302B(1), 302B(2) interacting with the content item 206, the content item 206 may be displayed on the user interface 200 of members 302C who have a direct connection 304 to the original recipients 302B(1), 302B(2) who interacted with the content item 206. The content item 206 may thus propagate through the social network on this basis, iteratively being interacted with by a first member 302 and, as a result, displayed on the user interface 200 of second members 302 who are connected to the first member 302. The second members 302 may then interact with the content item 206 and cause the content item 206 be displayed on additional members' 302 user interfaces 200, and so forth. A single member 302 may receive the content item 206 multiple times, and thus, e.g., be a member 302B and 302C.

It is noted that simply looking back at the social graph 300 to see what members 302 have interacted with a content item 206 may not provide reliable data for how the content item 206 propagated through the social network. It is noted that a single member 302 may be presented with the content item 206 on more than one occasion if multiple other members 302 with whom the member 302 has a connection 304 interact with the content item 206. Thus, when a member 302 does interact with a content item 206 it may not be apparent simply by looking at the social graph 300 what the source of the interaction was and, therefore, which members 302 tend to facilitate the spread of content items 206 through the social network.

Figure 4:
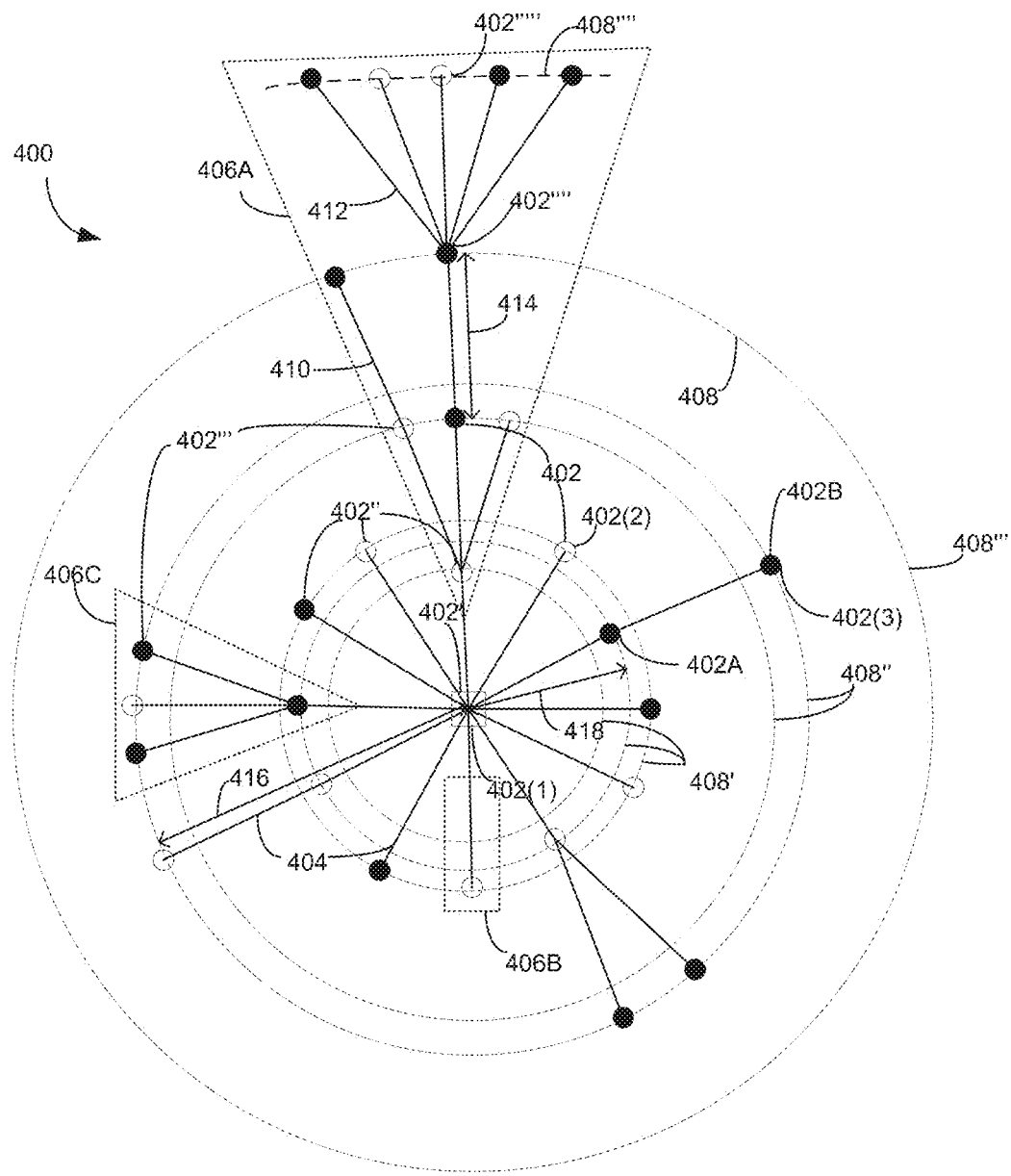
FIG. 4 is an illustration of a social network content item spread visualization, in an example embodiment.

FIG. 4 is an illustration of a social network content item 206 spread visualization 400, in an example embodiment. While the visualization 400 includes various distinctive features that may variously be apparent from a visual examination and as may be disclosed in detail herein, it is to be understood that a variety of visualizations may be generated on the basis of the principles disclosed herein. The visualization 400 is provided for illustration and is non-limiting.

The visualization 400 relates to a particular content item 206, though it is to be understood that the visualization 400 may incorporate data for multiple content items 206 in accordance with the principles disclosed herein. The visualization includes indicia 402 corresponding to a member 302 who has interacted with the content item 206. Each indicia 402 has a couple 404 to at least one other indicia 402. The couple 404 represents that the interaction of a first member 302 associated with a first indicia 402A resulted in the content item 206 being displayed on the user interface 200 of a second member 302 associated with the second indicia 402B and ultimately interacted with by the second member 302. The couple 404 as illustrated is a straight line, but it is to be understood that a couple 404 may include an arrow or other indicator of the direction of the flow of the content item 206 from indicia 402 to indicia 402 and may include various aesthetic changes as desired.

As illustrated, the indicia 402 include various types of indicia that illustrate different types of interactions. For instance, in the illustrated example, a square 402(1) indicates the posting or generation of the content item 206 to the social network in the first instance. An open circle 402(2) indicates a sharing of the content item 206. A closed circle or dot 402(3) indicates a comment, click, like, or other interaction with the content item 206. It is to be recognized and understood that any of a variety of types of indicia 402 may be utilized and may include variances in shapes, colors, size, and so forth. Additionally or alternatively, only a single indicia type, such as a dot 402(3), may be utilized in a visualization 400, in which case the dot 402(3) would represent any and all types of interactions with the content item 206.

The visualization 400 generally illustrates the flow of the content item 206 by radiating the couples 404 outward from one or more primary indicia 402'. A primary indicia 402' may be one or more indicia 402 that variously has the most couples 404 or the highest value of couples 404, as disclosed herein, that are or is directly or indirectly associated with the primary indicia 402' or that has a number of couples or value of couples that exceeds a predetermined threshold or percentage of couples 404 of the visualization 400, as disclosed herein. The primary indicia 402' may be but is not necessarily the originating indicia 402(1). Thus, while in general the spread of the content item 206 is radially outward from the primary indicia 402', in certain circumstances where a primary indicia 402' is not the originating indicia 402(1) the couple 404 may denote a spread of the content item radially inward to the primary indicia 402'. An indicia 402 may be selected to provide information related to the interaction, such as the interaction itself, the content item 206, information related to the member who engaged in the interaction, and so forth.

The visualization 400 may be recomputed and displayed for each individual indicia 402. In an example, a given indicia 402 may be selected and set as the primary indicia 402'. Indica 402 that flowed or stemmed from the new primary indicia 402' may be displayed on the updated visualization 400 while indicia 402 that do not flow from the new primary indicia 402' would be omitted. In an example, if the new primary indicia 402' corresponded to a share, an indicia 402 that was a comment on the sharing of the new primary indicia 402' would be displayed on the updated visualization 400 while an indicia 402 that was a "like" that did not trace to the share of the new primary indicia 402' would be omitted.

The indicia 402 and couples 404 form branches 406 that extend radially from the primary indicia 402'. Branches 406 are equally radially spaced from one another as illustrated, though it is to be understood that any of a variety of conventions for radially spacing branches 406 with respect to one another may be applied. Each branch 406 includes hierarchical levels 408 of the indica 402 based on the number of couples 404 between a given indicia 402 and the primary indicia 402'. Thus, a secondary indicia 402" is separated from the primary indicia 402' by one couple 404, a tertiary indicia 402'" is separated from the primary indicia 402' by two couples 404, and so forth. Various indicia 402 may include sub-branches 410, sub-sub-branches 412, and so forth. In creating and updated visualization 400 based on the selection of a new primary indicia 402', the updated visualization 400 may display only the indicia 402 that are farther down the branch 406 that previously corresponded to the new primary indicia 402'.

Each branch 406 has a branch weight based on some of a variety of factors, including the number of indicia 402 of the branch 406 and/or the number of levels 408 of the branch 406. In various examples, indicia 402 and levels 408 of a branch have a higher weight the closer the indicia 402 or level 408 is to the primary indicia 402'. Thus, a secondary indicia 402" or the level 408 of the secondary indicia 402' has a higher weight than a tertiary indicia 402'" or level 408 of the tertiary indicia 402'", and so forth.

In one illustrative example, the weight of a branch 406 is determined by summing a weight value for each of the indicia 402 of the branch. In such an example, a secondary indicia 402" has a weight value of ten (10), a tertiary indicia 402'" has a weight value of eight (8), a quaternary indicia 402"" has a weight value of five (5), a quinary indicia 402""' has a weight value of five (5), and so forth. Thus, for the branch 406A illustrated herein, the weight of the branch equals (1*10)+(3*8)+(7*6)+(10*5)=126.

The same principles described with respect to the number of indicia 402 of a branch may be applied as well to the number of levels 408 of the branch. Thus, in the illustrative example, the first level 408' has a weight value of ten (10), the second level 408" has a weight value of eight (8), the third level 408'" has a weight value of five (5), the fourth level 408"" has a weight value of five (5), and so forth. Thus, for the branch 406A, the weight of the branch equals twenty-nine (29).

The branch weight establishes a length 414 of the couples 404 of the branch 406. By extension, the length 414 of the couples 404 determines a total length 416 of the branch 406. Thus, as illustrated, certain secondary indicia 402" have differing couple lengths 414 and, thus, radial distances 418 from the primary indicia 402' even though they are all secondary indicia 402". It is noted that the lengths 414 and radial distances 418 may be adjusted so as to allow the depiction of all of the indicia 402 in the event that a density of the indicia 402 would cause the indicia 402 to overlap or otherwise become difficult to individually discern. Thus, the lengths 414 and radial distances 418 may define bands or regions in which the corresponding indicia 402 for the same weight would be found.

In the illustrated example, the couple length 414 within a branch 406 is equal between the various indicia 402 of the branch 406. The couple length 414 within a branch 406 is proportional to the weight of the branch divided by the number of levels 408 of the branch 406. Thus, in an example illustrated above, the branch 406A that has a weight of twenty-nine (29) and four levels 408 has a relative couple length 414 within the branch of 29/4=7.25. A branch 406B that has only one level 408 would, in such an example, have a branch weight of ten (10) and a relative couple length 414 of 10/1=10. A branch 406C that has two levels 408 would, in such an example, have a branch weight of 10+8=18 and a relative couple length 414 of 18/2=9.

On the basis of the above example, then, the couple lengths 414 in the longest branch 406A would be 7.25/10 as long as the couple lengths 414 of the shortest branch 406B. Thus, the first level 408' of the longest branch 406A would have a shorter radial distance 418 from the primary indicia 402' than the first level 408' of the shortest branch 406B. However, owing to having more total levels 408, the branch 406A is nevertheless longer than the branches 406B, 406C.

In the event that multiple indicia 402 meet the requirement to be a primary indicia 402', the one or more couples 404 between the primary indicia 402' may not necessarily conform to the principles applied to couples 404 that otherwise extend from the primary indicia 402'. In various examples, the couples 404 may have a length 414 that does not reflect a branch weight but rather is selected to space the primary indicia 402' apart sufficiently that indicia 402 and couples 404 that are included in the branches 406 of the primary indicia 402' do not overlap or otherwise interfere with one another.

While the visualization itself 400 is graphically developed based on the weight of the branches 406 relative to the primary indicia 402', each individual indicia 402 may have a separately calculated weight based on the principles disclosed herein. The weight each indicia 402 may be calculated as though that indicia 402 were the primary indicia 402', and the weight of each individual indicia 402 may be equal to the sum of all of the weights of the branches 406 that extend from that indicia 402. Put another way, the weight of an indicia 402 may be based on the number of interactions with the content item that are attributable to the interaction or origination of the content item by a member represented by the indicia. Thus, in the above example, a secondary indicia 402" that has three tertiary indicia 402''', five quaternary indicia 402'''', and seven quinary indicia 402''''' would, in the above example, have a weight of $3*10+5*8+7*6=116$. Alternatively, according to another above example, a secondary indicia 402" that has one branch that extends one level 408 (and thus has a weight of 10) and another branch that extends three levels 408 (and thus has a weight of $10+8+6=24$) would have a weight of $10+24=34$.

The weights of the individual indicia 402 may be utilized in identifying the primary indicia 402' as well as in identifying the members of the social network that tend to most facilitate the spread of content items 206 through the social network. For instance, each member of the social network may have an ongoing sum or average of weights to their interactions based on the subsequent interactions by other members of the social network, as illustrated in the visualization 400. Members with the highest sum or average of weights, for instance the one percent of the members of the social network with the highest sum or average weights, may have content items 206 with which they have interacted positioned higher in the news feed 202 that those of other members or may otherwise be promoted in the news feed 202. Thus, for instance, a content item 206 that would naturally be placed in the third position 204(3) of the news feed 202 would be placed in the second position 204(2) of the news feed 202 if the interaction that caused the content item 206 to be placed in the news feed 202 in the first place was by a member with a high weight.

The visualization 400 may be utilized to obtain information about the members and interactions associated with the indicia 402. In various examples, selecting an indicia 402 by clicking on the indicia 402, hovering a cursor over the indicia 402, and the like may cause information related to the indicia 402 to be displayed. The information may include an identity of an associated member of the social network, details about the interaction, the weight of the indicia 402, and any of a variety of information that a user might find useful.

Flowchart

Figure 5:
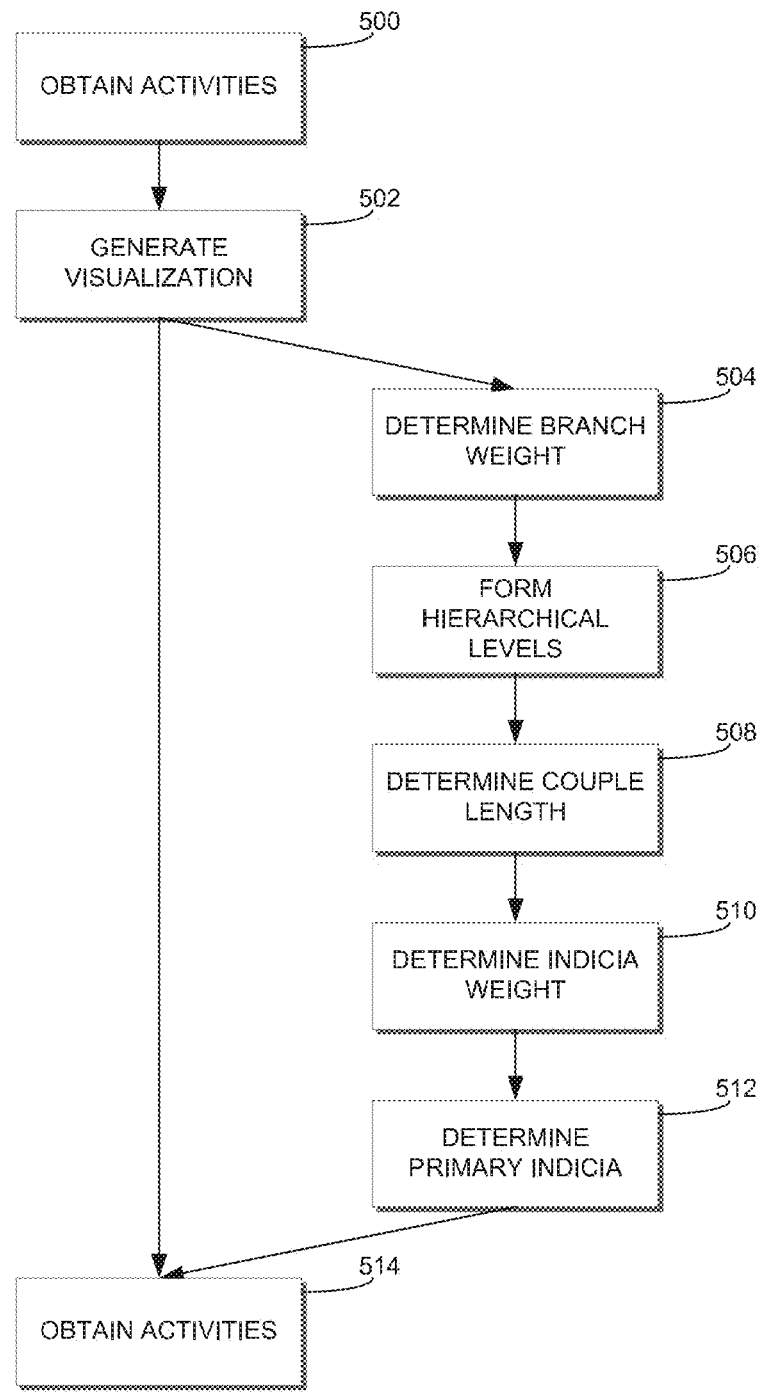
FIG. 5 is a flowchart for social network content spread visualization, in an example embodiment.

FIG. 5 is a flowchart for social network content spread visualization, in an example embodiment. The operations of the flowchart may be implemented on the social network system 100 or any suitable equipment or system.

At operation 500, a plurality of activity data related to a content item of the social network are obtained with a processor from a database, the plurality of activity data related to interactions by members of the social network with the content item.

At operation 502, a visualization based on the plurality of activity data is generated by the processor, the visualization including a plurality of indicia arranged in hierarchical branches, the branches extending radially from a primary indicia of the plurality of indicia, each of the plurality of indicia individually corresponding to one of the plurality of activity data and connected to at least one other one of the plurality of indicia with a couple based on a relationship between the corresponding ones of the plurality of activity data. In an example, the indicia are indicative of a type of interaction indicated by a one of the plurality of activity data corresponding to the indicia.

At operation 504, a branch weight for each one of the branches is determined by the processor based, at least in part, on the ones of the plurality of indicia of the one of the branches. A length of each couple of the one of the branches is based, at least in part, on the weight of the branch. In an example, the branch weight for one of the plurality of branches is determined based on a number of hierarchical levels though which the one of the plurality of branches extends and a proximity of individual ones of those hierarchical levels to the primary indicia.

In an example, each level of the one of the plurality of branches corresponds to a weight value and wherein the branch weight of the one of the plurality of branches is a sum of the weight value of each of the levels. In an example, the branch weight is determined based, at least in part, on a number of indicia of the plurality of indicia included in the one of the branches. In an example, each of the plurality of indicia of the one of the branches includes a weight value based on a proximity of a hierarchical level in which each of the plurality of indicia are included to the primary indicia, and wherein determining the branch weight of the one of the plurality of branches is based on a sum of the weight value of each of the levels.

At operation 506, the indicia are formed in hierarchical levels relative to the primary indicia, the couple between ones of the plurality of indicia extending between a first one of the plurality of indicia in a first level and a second one of the plurality of indicia in a second level adjacent to the first one of the plurality of levels.

At operation 508, a length of a couple is determined based on the branch weight of the branch.

At operation 510, an indicia weight is determined with the processor for one of the plurality of indicia based on indicia in all of the branches that extend from the one of the plurality of indicia.

At operation 512, the primary indicia is determined based on an indicia with the highest indicia weight At operation 514, a user interface is caused by the processor to display the visualization.

System

Figure 6:
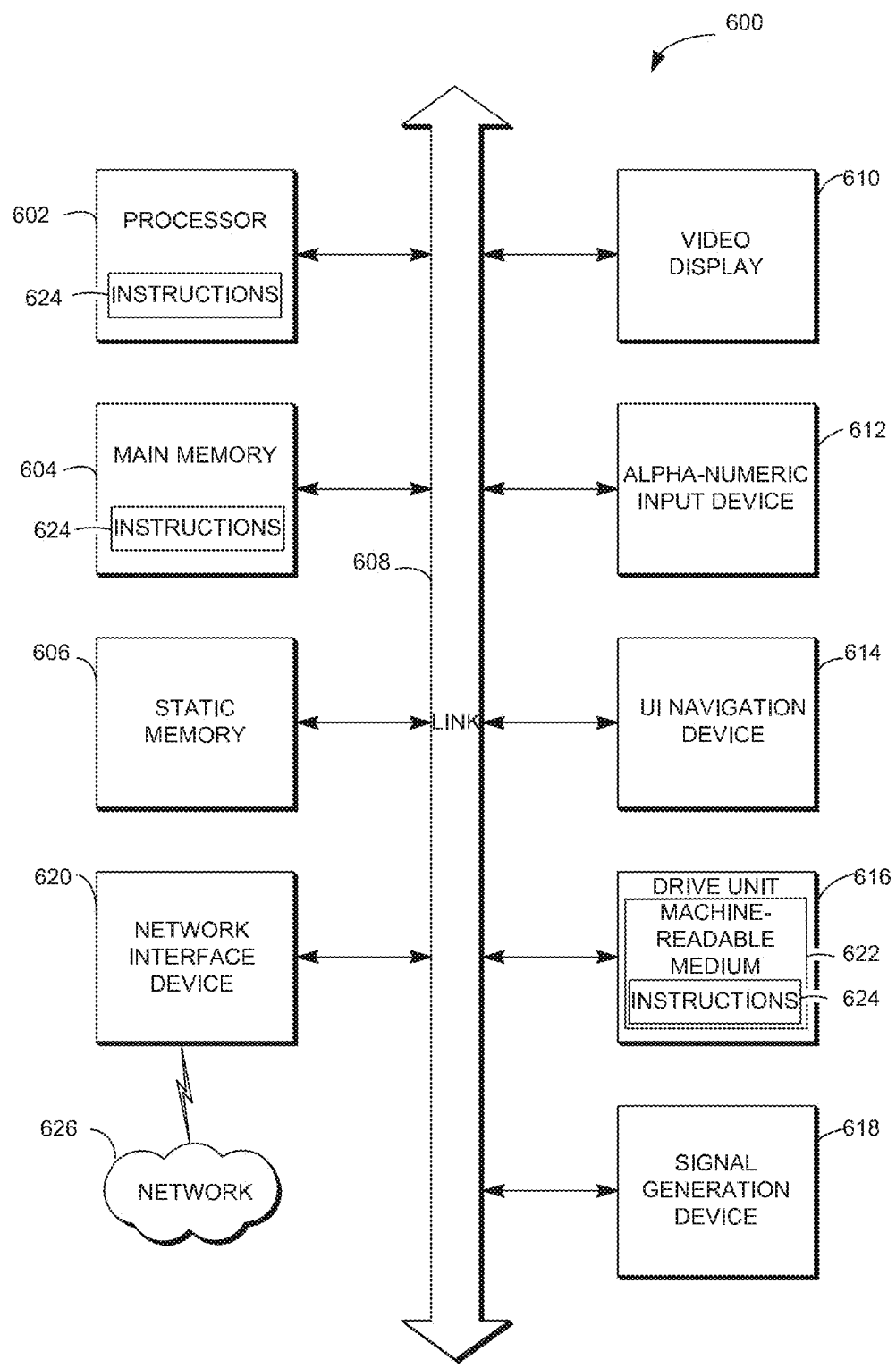
FIG. 6 is a block diagram illustrating components of a machine, according to some example embodiments.

FIG. 6 is a block diagram illustrating components of a machine 600, according to some example embodiments, able to read instructions from a machine-readable medium (e.g., a machine-readable storage medium) and perform any one or more of the methodologies discussed herein. Specifically, the machine 600 may implement the social network system 100 and the features included and described therein. The machine 600 thus describes specific hardware configurations on which the social network system 100 may be implemented and provided to users of the social network system 100.

FIG. 6 shows a diagrammatic representation of the machine 600 in the example form of a computer system and within which instructions 624 (e.g., software) for causing the machine 600 to perform any one or more of the methodologies discussed herein may be executed. In alternative embodiments, the machine 600 operates as a standalone device or may be connected (e.g., networked) to other machines. In a networked deployment, the machine 600 may operate in the capacity of a server machine or a client machine in a server-client network environment, or as a peer machine in a peer-to-peer (or distributed) network environment. The machine 600 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 624, sequentially or otherwise, that specify actions to be taken by that machine. Further, while only a single machine is illustrated, the term "machine" shall also be taken to include a collection of machines that individually or jointly execute the instructions 624 to perform any one or more of the methodologies discussed herein.

The machine 600 includes a processor 602 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 604, and a static memory 606, which are configured to communicate with each other via a bus 608. The machine 600 may further include a graphics display 610 (e.g., a plasma display panel (PDP), a light emitting diode (LED) display, a liquid crystal display (LCD), a projector, or a cathode ray tube (CRT)). The machine 600 may also include an alphanumeric input device 612 (e.g., a keyboard), a cursor control device 614 (e.g., a mouse, a touchpad, a trackball, a joystick, a motion sensor, or other pointing instrument), a storage unit 616, a signal generation device 618 (e.g., a speaker), and a network interface device 620.

The storage unit 616 includes a machine-readable medium 622 on which is stored the instructions 624 (e.g., software) embodying any one or more of the methodologies or functions described herein. The instructions 624 may also reside, completely or at least partially, within the main memory 604, within the processor 602 (e.g., within the processor's cache memory), or both, during execution thereof by the machine 600. Accordingly, the main memory 604 and the processor 602 may be considered as machine-readable media. The instructions 624 may be transmitted or received over a network 626 via the network interface device 620.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 622 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., software) for execution by a machine (e.g., machine 600), such that the instructions, when executed by one or more processors of the machine (e.g., processor 602), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method, comprising:
    obtaining, with a processor, from a database, a plurality of activity data related to a content item of the social network, the plurality of activity data related to interactions by members of the social network with the content item;
    generating, with the processor, a visualization based on the plurality of activity data, the visualization including a plurality of indicia arranged in hierarchical branches, the branches extending radially and circumferentially from a primary indicia of the plurality of indicia, each of the plurality of indicia individually corresponding to one of the plurality of activity data and connected to at least one other one of the plurality of indicia with a couple based on a relationship between the corresponding ones of the plurality of activity data; and
    causing, with the processor, a user interface to display the visualization;
    wherein generating the visualization includes determining, with the processor, a branch weight for each one of the branches based, at least in part, on the ones of the plurality of indicia of the one of the branches, wherein a length of each couple of the one of the branches is based, at least in part, on the weight of the branch.

2. The method of claim 1, wherein generating the visualization includes forming the indicia in hierarchical levels relative to the primary indicia, the couple between ones of the plurality of indicia extending between a first one of the plurality of indicia in a first level and a second one of the plurality of indicia in a second level adjacent to the first one of the plurality of levels.

3. The method of claim 2, determining the branch weight includes determining, with the processor, the branch weight for one of the plurality of branches based on a number of hierarchical levels through which the one of the plurality of branches extends and a proximity of individual ones of those hierarchical levels to the primary indicia.

4. The method of claim 3, wherein each level of the one of the plurality of branches corresponds to a weight value and wherein the branch weight of the one of the plurality of branches is a sum of the weight value of each of the levels.

5. The method of claim 2, wherein generating the visualization includes determining, with the processor, a length of the couple based on the branch weight of the branch.

6. The method of claim 2, wherein generating the visualization includes determining, with the processor, the branch weight based, at least in part, on a number of indicia of the plurality of indicia included in the one of the branches.

7. The method of claim 6, wherein each of the plurality of indicia of the one of the branches includes a weight value based on a proximity of a hierarchical level in which each of the plurality of indicia are included to the primary indicia, and wherein determining the branch weight of the one of the plurality of branches is based on a sum of the weight value of each of the levels.

8. The method of claim 1, wherein the indicia are indicative of a type of interaction indicated by a one of the plurality of activity data corresponding to the indicia.

9. The method of claim 1, wherein generating the visualization further includes:
determining, with the processor, for one of the plurality of indicia, an indicia weight based on indicia in all of the branches that extend from the one of the plurality of indicia; and
determining, with the processor, the primary indicia based on an indicia with the highest indicia weight.

10. A system, comprising:
an electronic data storage device configured to store a database including a plurality of activity data related to a content item of a social network, the plurality of activity data related to interactions by members of the social network with the content item;
a network interface communicatively coupled to a user device; and
a processor, configured to:
obtain the plurality of activity data from the database;
generate a visualization based on the plurality of activity data, the visualization including a plurality of indicia arranged in hierarchical branches, the branches extending radially and circumferentially from a primary indicia of the plurality of indicia, each of the plurality of indicia individually corresponding to one of the plurality of activity data and connected to at least one other one of the plurality of indicia with a couple based on a relationship between the corresponding ones of the plurality of activity data;
wherein generating the visualization includes determining a branch weight for each one of the branches based, at least in part, on the ones of the plurality of indicia of the one of the branches, wherein a length of each couple of the one of the branches is based, at least in part, on the weight of the branch; and
cause, via the network interface, a user interface to display the visualization.

11. The system of claim 10, wherein the processor is configured to generate the visualization having the indicia form hierarchical levels relative to the primary indicia, the couple between ones of the plurality of indicia extending between a first one of the plurality of indicia in a first level and a second one of the plurality of indicia in a second level adjacent to the first one of the plurality of levels.

12. The system of claim 11, wherein the branch weight for one of the plurality of branches is determined based on a number of hierarchical levels through which the one of the plurality of branches extends and a proximity of individual ones of those hierarchical levels to the primary indicia.

13. The system of claim 12, wherein the each level of the one of the plurality of branches corresponds to a weight value and wherein the branch weight of the one of the plurality of branches is a sum of the weight value of each of the levels.

14. The system of claim 11, wherein a length of the couple is based on the branch weight of the branch.

15. The system of claim 11, wherein the branch weight is based, at least in part, on a number of indicia of the plurality of indicia included in the one of the branches.

16. The system of claim 15, wherein each of the plurality of indicia of the one of the branches includes a weight value based on a proximity of a hierarchical level in which each of the plurality of indicia are included to the primary indicia, and wherein the branch weight the one of the plurality of branches is a sum of the weight value of each of the levels.

17. The system of claim 10, wherein the indicia are indicative of a type of interaction indicated by a one of the plurality of activity data corresponding to the indicia.

18. The system of claim 10, wherein the processor is further configured to:
determine, for one of the plurality of indicia, an indicia weight based on indicia in all of the branches that extend from the one of the plurality of indicia; and
determine the primary indicia based on an indicia with the highest indicia weight.

19. A non-transitory computer readable medium, comprising instructions which, when implemented by a processor, cause the processor to perform operations comprising:
obtain from a database a plurality of activity data related to a content item of the social network, the plurality of activity data related to interactions by members of the social network with the content item;
generate a visualization based on the plurality of activity data, the visualization including a plurality of indicia arranged in hierarchical branches, the branches extending radially from a primary indicia of the plurality of indicia, each of the plurality of indicia individually corresponding to one of the plurality of activity data and connected to at least one other one of the plurality of indicia with a couple based on a relationship between the corresponding ones of the plurality of activity data; and
cause a user interface to display the visualization;
wherein generating the visualization includes determining a branch weight for each one of the branches based, at least in part, on the ones of the plurality of indicia of the one of the branches, wherein a length of each couple of the one of the branches is based, at least in part, on the weight of the branch.

20. The computer readable medium of claim 19, wherein generating the visualization includes forming the indicia in hierarchical levels relative to the primary indicia, the couple between ones of the plurality of indicia extending between a first one of the plurality of indicia in a first level and a second one of the plurality of indicia in a second level adjacent to the first one of the plurality of levels.

* * * * *